United States Patent
Newman et al.

(10) Patent No.: US 10,666,678 B2
(45) Date of Patent: May 26, 2020

(54) THREAT INTELLIGENCE MANAGEMENT IN SECURITY AND COMPLIANCE ENVIRONMENT

(71) Applicant: MICROSOFT TECHNOLOGY LICENSING, LLC, Redmond, WA (US)

(72) Inventors: Philip K. Newman, Seattle, WA (US); Puhazholi Vetrivel, Redmond, WA (US); Krishna Kumar Parthasarathy, Redmond, WA (US); Binyan Chen, Bellevue, WA (US); Manas Singh, Redmond, WA (US); Ashish Mishra, Bothell, WA (US); Sudhakar Narayanamurthy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 125 days.

(21) Appl. No.: 15/473,998

(22) Filed: Mar. 30, 2017

(65) Prior Publication Data
US 2018/0191771 A1    Jul. 5, 2018

Related U.S. Application Data

(60) Provisional application No. 62/440,934, filed on Dec. 30, 2016.

(51) Int. Cl.
*H04L 29/06* (2006.01)
*G06F 21/55* (2013.01)

(52) U.S. Cl.
CPC ........ *H04L 63/1441* (2013.01); *G06F 21/552* (2013.01); *G06F 21/554* (2013.01); *H04L 63/1433* (2013.01); *H04L 63/20* (2013.01)

(58) Field of Classification Search
CPC . H04L 63/1441; H04L 63/1433; H04L 63/20; G06F 21/554; G06F 21/552
See application file for complete search history.

(56) References Cited

U.S. PATENT DOCUMENTS 8,464,335 B1   6/2013   Sinha et al.
8,577,823 B1   11/2013   Gadir
(Continued)

FOREIGN PATENT DOCUMENTS

WO   2016138067 A1   9/2016
WO   2016138566 A1   9/2016

OTHER PUBLICATIONS

"Threatprotect", https://www.qualys.com/docs/threatprotect-datasheet.pdf, Retrieved on: Mar. 1, 2017, pp. 1-3.
(Continued)

*Primary Examiner* — Meng Li
(74) *Attorney, Agent, or Firm* — Michael Best & Friedrich LLP

(57) ABSTRACT

Threat intelligence management is provided in a security and compliance environment. A threat explorer platform or module of a security and compliance service may detect, investigate, manage, and provide actionable insights for threats at an organizational level. Working with a data insights platform that collects different types of signals (metadata, documents, activities, etc.) and correlates in a multi-stage evaluation, the threat intelligence module may provide actionable visual information on potential threats, affected areas, and actionable insights derived from internal threat data and external information using contextual correlation of data within the data insight platform. User experience may be dynamically adjusted at multiple levels based on context and allow users to drill down arbitrarily deep.

19 Claims, 12 Drawing Sheets

(56) References Cited

U.S. PATENT DOCUMENTS

| | | | |
|---|---|---|---|
| 9,092,616 | B2 | 7/2015 | Kumar et al. |
| 9,100,422 | B1 | 8/2015 | Tidwell et al. |
| 9,117,027 | B2 | 8/2015 | Dayal et al. |
| 9,203,723 | B2 | 12/2015 | Matthews et al. |
| 9,386,033 | B1 | 7/2016 | Rossman |
| 9,438,648 | B2 | 9/2016 | Asenjo et al. |
| 9,444,819 | B2 | 9/2016 | Muppidi et al. |
| 9,509,711 | B1 | 11/2016 | Keanini et al. |
| 9,692,778 | B1 * | 6/2017 | Mohanty ............ H04L 63/1433 |
| 10,230,749 | B1 | 3/2019 | Rostami-Hesarsorkh et al. |
| 2002/0091940 | A1 | 7/2002 | Welborn et al. |
| 2005/0065807 | A1 | 3/2005 | Deangelis et al. |
| 2009/0307755 | A1 | 12/2009 | Dvorak et al. |
| 2010/0319004 | A1 | 12/2010 | Hudson et al. |
| 2012/0072985 | A1 | 3/2012 | Davne et al. |
| 2012/0185945 | A1 | 7/2012 | Andres et al. |
| 2012/0210434 | A1 | 8/2012 | Curtis et al. |
| 2014/0181982 | A1 | 6/2014 | Guo et al. |
| 2014/0289793 | A1 * | 9/2014 | Moloian ............... G06F 16/283 726/1 |
| 2014/0297569 | A1 | 10/2014 | Clark et al. |
| 2015/0067761 | A1 | 3/2015 | Bade et al. |
| 2015/0163199 | A1 | 6/2015 | Kailash et al. |
| 2015/0172321 | A1 * | 6/2015 | Kirti ..................... H04L 63/20 726/1 |
| 2015/0178135 | A1 | 6/2015 | Wang |
| 2015/0319185 | A1 | 11/2015 | Kirti et al. |
| 2015/0324606 | A1 | 11/2015 | Grondin et al. |
| 2016/0112453 | A1 | 4/2016 | Martinez et al. |
| 2016/0119357 | A1 | 4/2016 | Kinsella et al. |
| 2016/0127418 | A1 | 5/2016 | Maes et al. |
| 2016/0142433 | A1 | 5/2016 | Nasu |
| 2016/0156671 | A1 | 6/2016 | Cabrera et al. |
| 2016/0173500 | A1 | 6/2016 | Sharabi et al. |
| 2016/0248799 | A1 | 8/2016 | Ng et al. |
| 2016/0255117 | A1 | 9/2016 | Sinha et al. |
| 2016/0306965 | A1 | 10/2016 | Iyer et al. |
| 2016/0335303 | A1 | 11/2016 | Madhalam et al. |
| 2016/0359915 | A1 | 12/2016 | Gupta et al. |
| 2017/0034196 | A1 | 2/2017 | Chauhan et al. |
| 2017/0041206 | A1 | 2/2017 | Maes et al. |
| 2017/0116426 | A1 | 4/2017 | Pattabhiraman et al. |
| 2017/0187739 | A1 * | 6/2017 | Spiro ................ G06F 16/24578 |
| 2017/0223040 | A1 * | 8/2017 | Ikuse ..................... G06F 21/55 |
| 2017/0236131 | A1 | 8/2017 | Nathenson et al. |
| 2017/0289178 | A1 | 10/2017 | Roundy et al. |
| 2017/0329991 | A1 | 11/2017 | Van dyne et al. |
| 2018/0189517 | A1 | 7/2018 | Larson et al. |
| 2018/0191730 | A1 | 7/2018 | Deters et al. |
| 2018/0191781 | A1 | 7/2018 | Palani et al. |
| 2018/0232779 | A1 | 8/2018 | Nordholm et al. |

OTHER PUBLICATIONS

"Cyber Threat Intelligence", https://web.archive.org/web/20151123165833/http:/www2.deloitte.com/content/dam/Deloitte/lu/Documents/risk/lu-cyber-threat-intelligence-cybersecurity-29102014. pdf, Published on: Nov. 23, 2015, pp. 44-49.

Lord, Nate, "What is Threat Intelligence? Finding the Right Threat Intelligence Sources for Your Organization", https://digitalguardian.com/blog/what-threat-intelligence-finding-right-threat-intelligence-sources-your-organization, Published on: Oct. 11, 2016, 4 pages.

Muniz, et al., "Overview of Security Operations Center Technologies", http://www.ciscopress.com/articles/article.asp?p=2455014&seqNum=3, Published on: Dec. 15, 2015. 2 pages.

"Endpoint security", http://www-03.ibm.com/software/products/en/category/endpoint-security, Retrieved on: Mar. 1, 2017, 2 pages.

"Protecting corporate credentials against today's threats", In White Paper of IBM, Sep. 2014, pp. 1-8.

Dupont, Guillaume, "Threat Intelligence and SIEM (Part 1)—Reactive Security", https://www.recordedfuture.com/siem-threat-intelligence-part-1/, Published Date: Jan. 19, 2016, 8 Pages.

"International Search Report and Written Opinion Issued in PCT Application No. PCT/US2017/068388", dated Feb. 27, 2018, 11 Pages.

"Alert Logic", Retrieved From: https://www.alertlogic.com/solutions/alertlogic-technology/activewatch/, Feb. 27, 2017, 6 Pages.

"Alert Logic Security-As-A-Service", Retrieved From: https://c368768.ssl.cf1.rackcdn.com/product_files/19358/original/AL_vCloudAir_ISV_CoBrand_Finaldf447a93ccbd89028bec0ea470b3906f. pdf, Feb. 27, 2017, 2 Pages.

"Consul InSight Security Manager", Retrieved From: http://jdcmg.isc.ucsb.edu/docs/secpresent/IBM-BR-Consul-InSight2.pdf, Aug. 18, 2014, 2 Pages.

"Enterprise Data Analytics", Retrieved From: https://web.archive.org/web/20170313180644/http://www.alteryx.com/analytics/enterprise-data-analytics, Feb. 21, 2017, 1 Page.

"Managed Security Services: SIEM", Retrieved From: http://www.tatacommunications.com/sites/default/files/MSS-SIEM-Datasheet-47073_0.pdf, Feb. 17, 2017, 2 Pages.

"Oracle Security Monitoring and Analytics Cloud Service", Retrieved From: https://cloud.oracle.com/opc/paas/datasheets/OMC_SMA_DataSheet.pdf, Feb. 27, 2017, 3 Pages.

"Protect and Audit Sensitive Data", Retrieved From: http://teleran.com/wp-content/uploads/2016/12/Data-Security-and-Compliance-Solution-Teleran-Data-Sheet.pdf, Feb. 27, 2017, 5 Pages.

"SIEM Solutions from McAfee", Retrieved From: https://lwww.mcafee.com/in/resources/data-sheets/ds-siem-solutions-from-mcafee. pdf, Feb. 27, 2017, 3 Pages.

"Speed Malware Incident Response with Better Traffic Insight and Context from Gigamon and Plixer", Retrieved From: https://www.gigamon.com/content/dam/resource-library/english/technology-partner-solution-brief/js-plixer-gigamon.pdf, Feb. 27, 2017, 2 Pages.

"Trend Micro Deep Security", In White Paper of Trend Micro, Aug. 2009, 13 Pages.

"Non Final Office Action Issued in U.S. Appl. No. 15/462,466", dated Nov. 2, 2018, 21 Pages.

"Non-Final Office Action Issued in U.S. Appl. No. 15/471,243", dated Nov. 23, 2018, 13 Pages.

Alym, Rayani, "Applying intelligence to security and compliance in Office 365", Retrieved From: https://www.microsoft.com/en-in/microsoft-365/blog/2016/09/26/applying-intelligence-to-security-and-compliance-in-office-365/, Sep. 26, 2016, 9 Pages.

Chen, et al., "Collaborative network security in multi-tenant data center for cloud computing", In Proceedings of Tsinghua Science and Technology, vol. 19, Issue 1, Feb. 2014, 3 Pages.

Hashizume, et al., "An analysis of security issues for cloud computing", In Journal of Internet Services and Applications, vol. 4, Issue 5, Feb. 27, 2013, 20 Pages.

Hassanzadeh, et al., "Helix: Online Enterprise Data Analytics", In Proceedings of the 20th international conference companion on World wide web, Mar. 28, 2011, 4 Pages.

Hoff, et al., "Security Guidance for Critical Areas of Focus in Cloud Computing", https://downloads.cloudsecurityalliance.org/assets/research/security-guidance/csaguide.v3.0.pdf, 2011, 177 Pages.

Kandel, et al., "Enterprise Data Analysis and Visualization: An Interview Study", In Journal of IEEE Transactions on Visualization and Computer Graphics, vol. 18, No. 12, Dec. 2012, 10 Pages.

Kavanagh, et al., "2016 Magic Quadrant for SIEM", Retrieved From: https://securelink.be/wp-content/uploads/sites/7/2016-Magic-Quadrant-for-SIEM.pdf, Aug. 10, 2016, 30 Pages.

Mullaney, et al., "Multi-tenant applications with elastic database tools and row-level security", Retrieved from: https://docs.microsoft.com/en-us/azure/sql-database/sql-database-elastic-tools-multi-tenant-row-level-security, Apr. 27, 2016, 11 Pages.

"International Search Report & Written Opinion Issued in PCT Patent Application No. PCT/US17/066238", dated Feb. 12, 2018, 9 Pages.

"International Search Report and Written Opinion Issued in PCT Application No. PCT/US2017/066239", dated Feb. 2, 2018, 11 Pages.

Pepelnjak, Ivan, et al., "Cloud Security: Ensuring multi-tenant security in cloud services", http://searchtelecom.techtarget.com/tip/Cloud-Security-Ensuring-multi-tenant-security-in-cloud-services, Mar. 1, 2011, 6 Pages.

(56) References Cited

OTHER PUBLICATIONS

Schnitzer, et al., "Meeting Risk and Compliance Requirements While Expanding the Business Value of Data-Intensive Applications", Retrieved From: http://teleran.com/wp-content/uploads/2017/01/Meeting-GRC-Demands_Improving-Business-Value_Teleran-Case-Study.pdf, Feb. 27, 2017 (Retrieved on), 12 Pages.
"Final Office Action Issued in U.S. Appl. No. 15/471,243", dated Mar. 19, 2019, 12 Pages.
"Non Final Office Action Issued in U.S. Appl. No. 15/474,042", dated Jun. 13, 2019, 19 Pages.
"Final Office Action Issued in U.S. Appl. No. 15/462,466", dated May 10, 2019, 18 Pages.
"Non Final Office Action Issued in U.S. Appl. No. 15/471,243", dated Aug. 14, 2019, 13 Pages.
"Notice of Allowance Issued in U.S. Appl. No. 15/462,466", dated Sep. 13, 2019, 12 Pages.
"Final Office Action Issued in U.S. Appl. No. 15/474,042", dated Dec. 9, 2019, 19 Pages.
"Final Office Action Issued in US Patent Application No. 15/471,243" dated Dec. 26, 2019, 11 Pages.

* cited by examiner

THREAT INTELLIGENCE MANAGEMENT IN SECURITY AND COMPLIANCE ENVIRONMENT

CROSS-REFERENCE TO RELATED APPLICATION

This application claims the benefit under 35 U.S.C. § 119(e) of U.S. Patent Application No. 62/440,934 filed on Dec. 30, 2016. The U.S. Patent Application is herein incorporated by reference in its entirety.

BACKGROUND

Hosted services provided by tenants of service providers to their users, such as companies to their employees or organizations to their members, are an increasingly common software usage model. Hosted services cover a wide range of software applications and systems from cloud storage to productivity, and collaboration to communication. Thus, any number of users may utilize applications provided under a hosted service umbrella in generating, processing, storing, and collaborating on documents and other data.

Accuracy, efficiency, and effectiveness of threat management services can increase in proportion to the range and type of underlying data and analysis capabilities on such data. For example, checking only incoming emails or attachments for malicious threat can be very limiting and not catch actions of users or malware that has slipped through the defenses. Conventional services directed to security or compliance are typically single-dimensional and suffer results of those limitations.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to threat intelligence management in a security and compliance environment. In some examples, a tenant's service environment may be analyzed to determine received and potential threats based on an analysis of correlated and multi-stage evaluated data, where the correlated and multi-stage evaluated data includes communications, stored content, metadata, and activities. A potential impact may be determined for each received threat based on analysis results and the received and potential threats and potential impacts presented through one or more interactive visualizations, where at least one element of each visualization is actionable. A remediation for each received threat may then be presented and/or automatically implemented.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
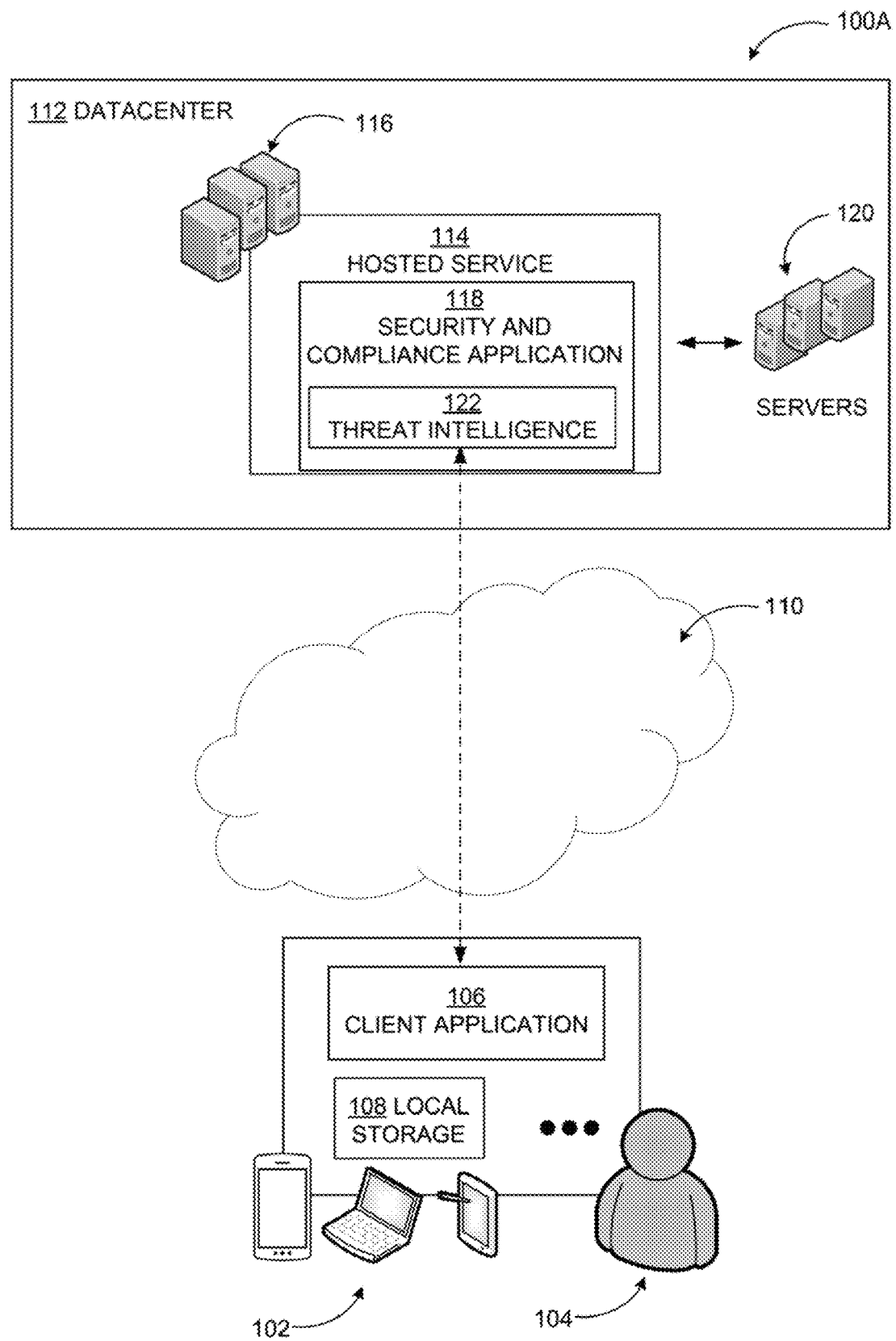
FIGS. 1A through 1C include display diagrams illustrating an example network environment where a system to provide threat intelligence management in a security and compliance environment may be implemented.

As briefly described above, embodiments are directed to threat intelligence management in a security and compliance environment. In some examples, a threat explorer module of a security and compliance service may detect, investigate, manage, and provide actionable insights for threats at an organizational level. Working with a data insights platform that collects different types of signals (metadata, documents, activities, etc.) and correlates in a multi-stage evaluation, the threat intelligence module may provide actionable visual information on potential threats, affected areas, and actionable insights derived from internal threat data and external information using contextual correlation of data within the data insight platform. User experience may be dynamically adjusted at multiple levels based on context and allow users to drill down arbitrarily deep.

As used herein, contextual correlation refers to multi-stage evaluation and correlation of data such as communications, documents, and non-document content in light of associated metadata and activities. For example, deletion of documents in a particular location may be assessed for a potential threat based on sensitive information content of the documents, deleting person or entity, location of the deleting person or entity, etc. Thus, a more granular approach to threat assessment and management may be achieved reducing false positives and allowing early detection of actual threats.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing threat intelligence management in a security and compliance environment. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1B:
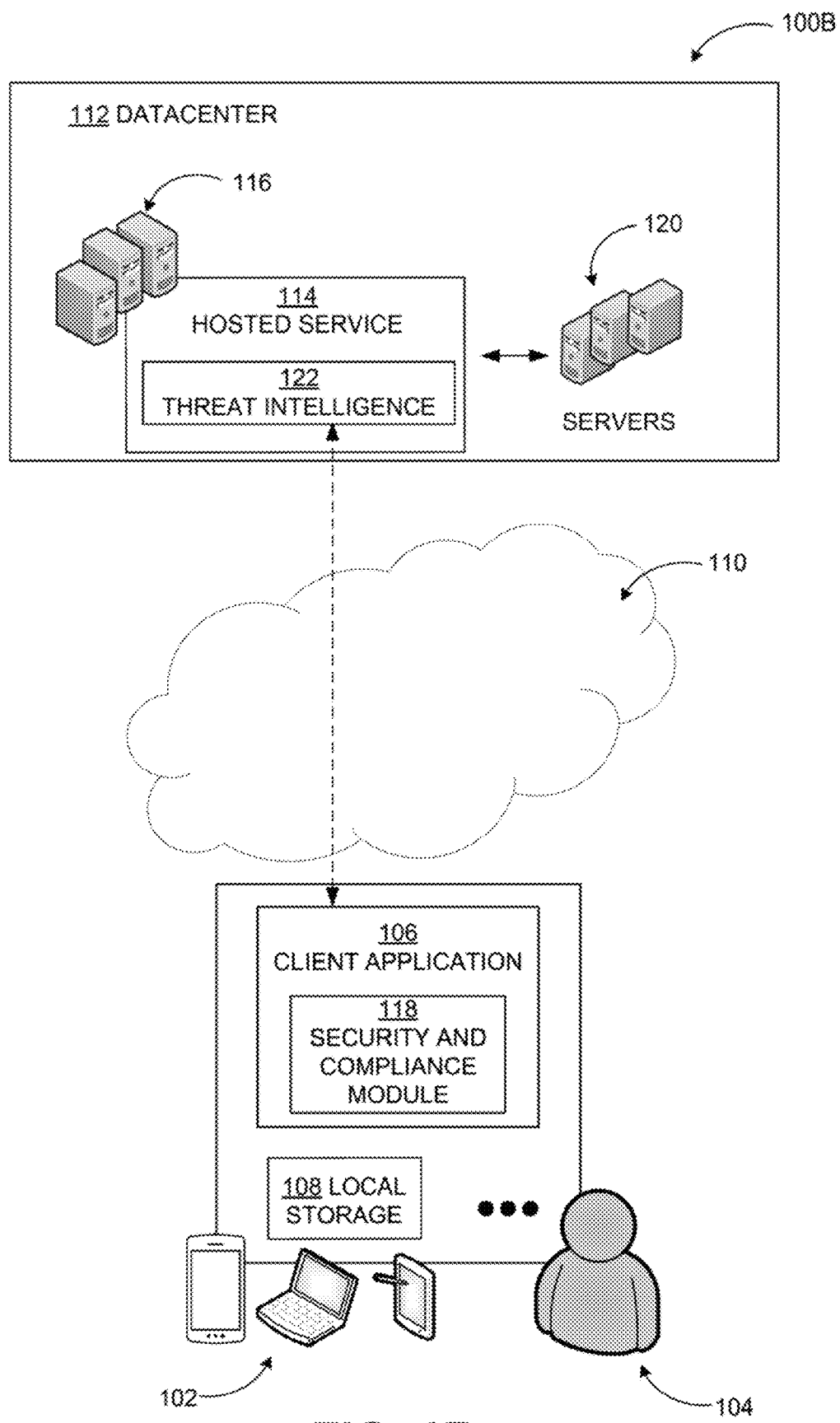
Figure 1C:
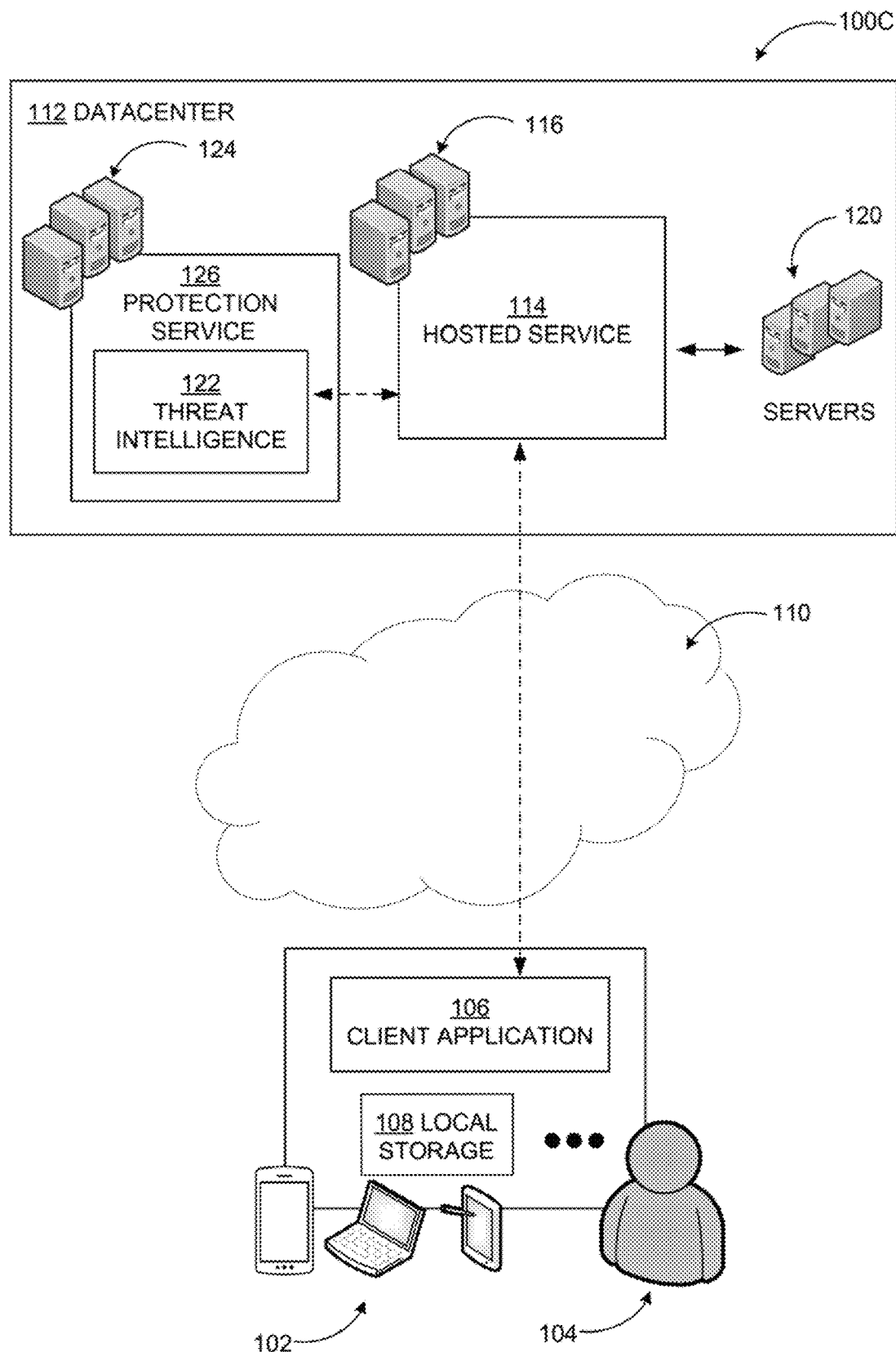

FIGS. 1A through 1C include display diagrams illustrating an example network environment where a system to provide threat intelligence management in a security and compliance environment may be implemented.

As illustrated in diagrams 100A-100C, an example system may include a datacenter 112 executing a hosted service 114 on at least one processing server 116, which may provide productivity, communication, cloud storage, collaboration, and comparable services to users in conjunction with other servers 120, for example. The hosted service 114 may further include scheduling services, online conferencing services, and comparable ones. The hosted service 114 may be configured to interoperate with a client application 106 through one or more client devices 102 over one or more networks, such as network 110. The client devices 102 may include a desktop computer, a laptop computer, a tablet computer, a vehicle-mount computer, a smart phone, or a wearable computing device, among other similar devices. In some examples, the hosted service 114 may allow users to access its services through the client application 106 executed on the client devices 102. In other examples, the hosted service 114 may be provided to a tenant (e.g., a business, an organization, or similar entities), which may configure and manage the services for their users.

In one embodiment, as illustrated in diagram 100A, the processing server 116 may be operable to execute a security and compliance application 118 of the hosted service 114, where the security and compliance application 118 may be integrated with the hosted service 114 to provide data management, security, threat management, data storage and processing compliance, and similar services. The security and compliance application 118 may include a threat intelligence module 122 configured to analyze correlated and multi-stage evaluated data that includes communications, stored content, metadata, and activities, and determine a potential impact for received threats based on analysis results. The threat intelligence module 122 may also present the received and potential threats and potential impacts through one or more interactive and actionable visualizations and present or automatically implement a remediation action fix the threat(s).

In another embodiment, as illustrated in diagram 100B, the security and compliance module 118 may be executed at a diem device 102 in conjunction with the client application 106. The threat intelligence module 122 may still be within the hosted service 114 receiving and monitoring data and activities throughout the hosted service 114 and providing the above-mentioned services. In a further embodiment, as illustrated in diagram 100C, the threat intelligence module 122 may be integrated with a separate protection service 126 and executed by one or more processing servers 124 of the protection service 126. The protection service 126 may be configured to serve the hosted service 114 and/or multiple applications associated with the hosted service 114, such as the client application 106. Furthermore, the protection service 126 may provide its services to multiple hosted services. Thus, if a tenant subscribes to multiple hosted services, common information (e.g., analysis results, user profiles, data and metadata) may be used to coordinate suggested policies and configurations reducing duplication of policy implementation burden on the administrators. As described herein, the hosted service 114, the security and compliance application 118, the threat intelligence module 122, and the protection service 126 may be implemented as software, hardware, or combinations thereof.

In some embodiments, the threat intelligence module 122 may be configured to determine internal threats from contextually correlated and multi-stage evaluate data provided by a data insights platform and combined with external information such as trending threats in context of organizational information. Same factors and signals may also be used to determine actionable insights.

As previously discussed, hosted services provided by tenants of service providers to their users are an increasingly common software usage model because it allows any number of users to utilize applications provided under the hosted service umbrella in generating, processing, storing, and collaborating on documents and other data. The usage of hosted services may include processing and storage or large amounts of data by large numbers of users making the data and the underlying infrastructure vulnerable to internal and external threats. Thus, it is a challenging endeavor for system administrators to allow efficient and unencumbered access to data and resources to users while proactively protecting the system and data. Implementation of threat intelligence management in a security and compliance environment as described herein may allow tenants of a hosted service to understand their security environment, determine their vulnerabilities and protection needs, configure their systems, implement policies/remediation actions, and customize user interfaces in an efficient manner. Through these technical advantages, processing and network capacity may be preserved, data security may be enhanced, usability may be improved, and user interactivity may be increased.

Embodiments, as described herein, address a need that arises from a very large scale of operations created by software-based services that cannot be managed by humans. The actions/operations described herein are not a mere use of a computer, but address results of a system that is a direct consequence of software used as a service offered in conjunction with a large numbers of devices and users using hosted services.

Figure 2A:
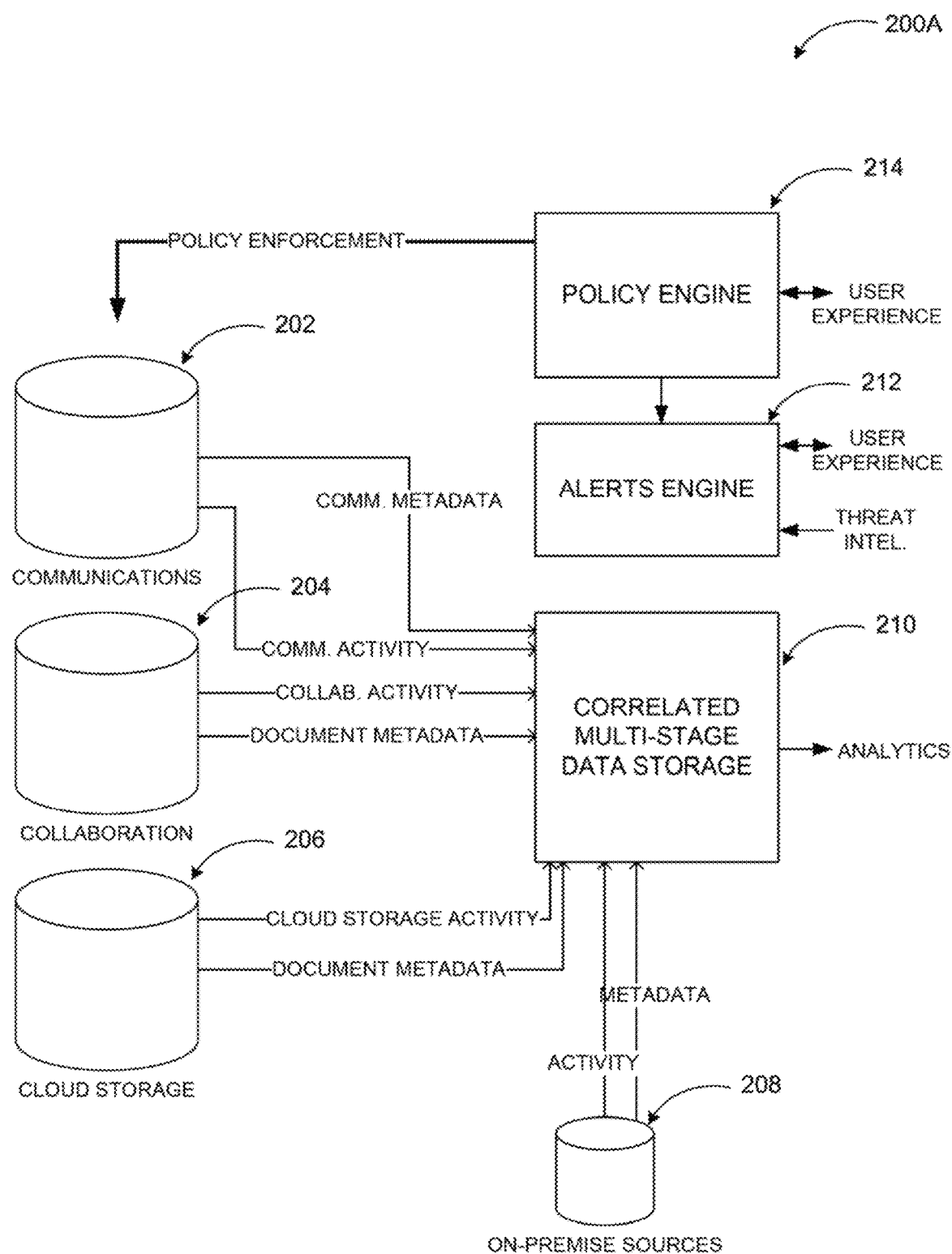
FIGS. 2A and 2B include display diagrams illustrating components and interactions of a security and compliance service providing threat intelligence management in a security and compliance environment.
Figure 2B:
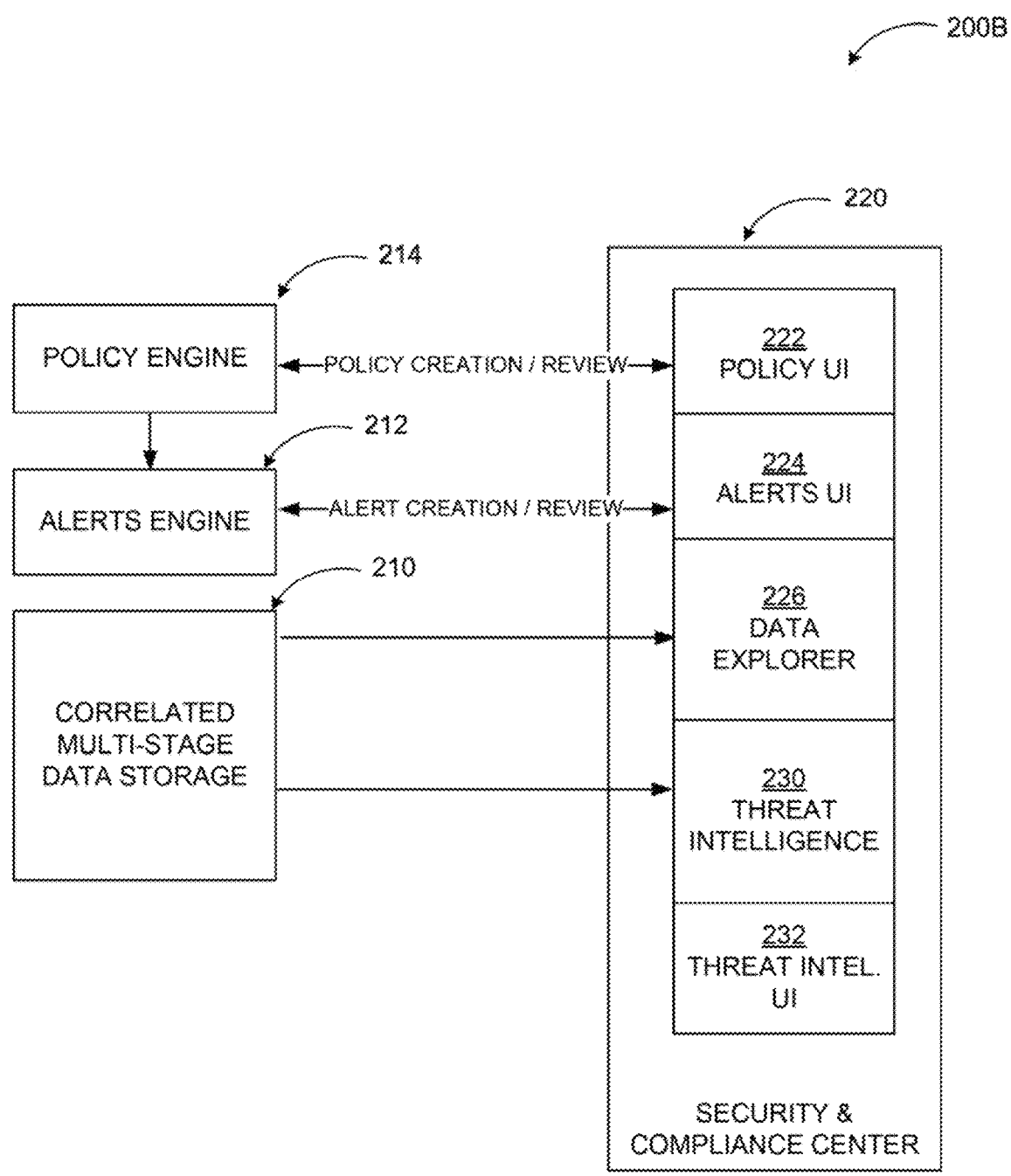

FIGS. 2A and 2B include display diagrams illustrating components and interactions of a security and compliance service providing threat intelligence management in a security and compliance environment.

Diagrams 200A and 200B show an example infrastructure for a comprehensive security and compliance service that may include among its components a threat intelligence module for providing threat intelligence management in a security and compliance environment. In some examples, data to be analyzed, categorized, protected, and handled according to policies may come from a variety of sources such as a communications data store 202, a collaboration data store 204, and cloud storage 206. On-premise data sources 208 may also contribute to the data to be processed. A correlated, multi-stage data storage service 210 (also referred to as a data insights platform) may receive stored data, activities associated with the data, and metadata, and correlate the data at multiple levels based on the activities and metadata. For example, a threat analysis looking at sharing of all document containing sensitive information may be an overkill and consume unnecessary resources, result in false positives, etc. In a system according to embodiments, a more fine-tuned approach may be implemented based on the contextual correlation. For example, external sharing of documents containing financial (e.g., credit card numbers) or personal (e.g., social security numbers) may be used as a trigger for threat assessment. Policies and remediation actions may be determined according to these more granular categories allowing a more accurate and efficient handling and protection of the data.

The larger infrastructure may also include an alerts engine 212 to determine and issue alerts based on threats or unacceptable data usage, and a policy engine 214 to determine and implement retention, handling, and protection policies. As shown in diagram 200B, the correlated, multi-stage data storage may be utilized by a multitude of modules such as a threat intelligence module 230 to manage internal and external threats and data explorer module 226 to identify categories of data and determine applicable policies and remediation actions for the identified data. User experiences such as threat intelligence user interface 232, alerts user interface 224, and policy user interface 222 may be provided as part of a security and compliance center 220 to present actionable visualizations associated with various aspects of the service and receive user/administrator input to be provided to the various modules. Various application programming interfaces (APIs) such as REST API may be used for exchange of communications among the different components of the system.

Figure 3:
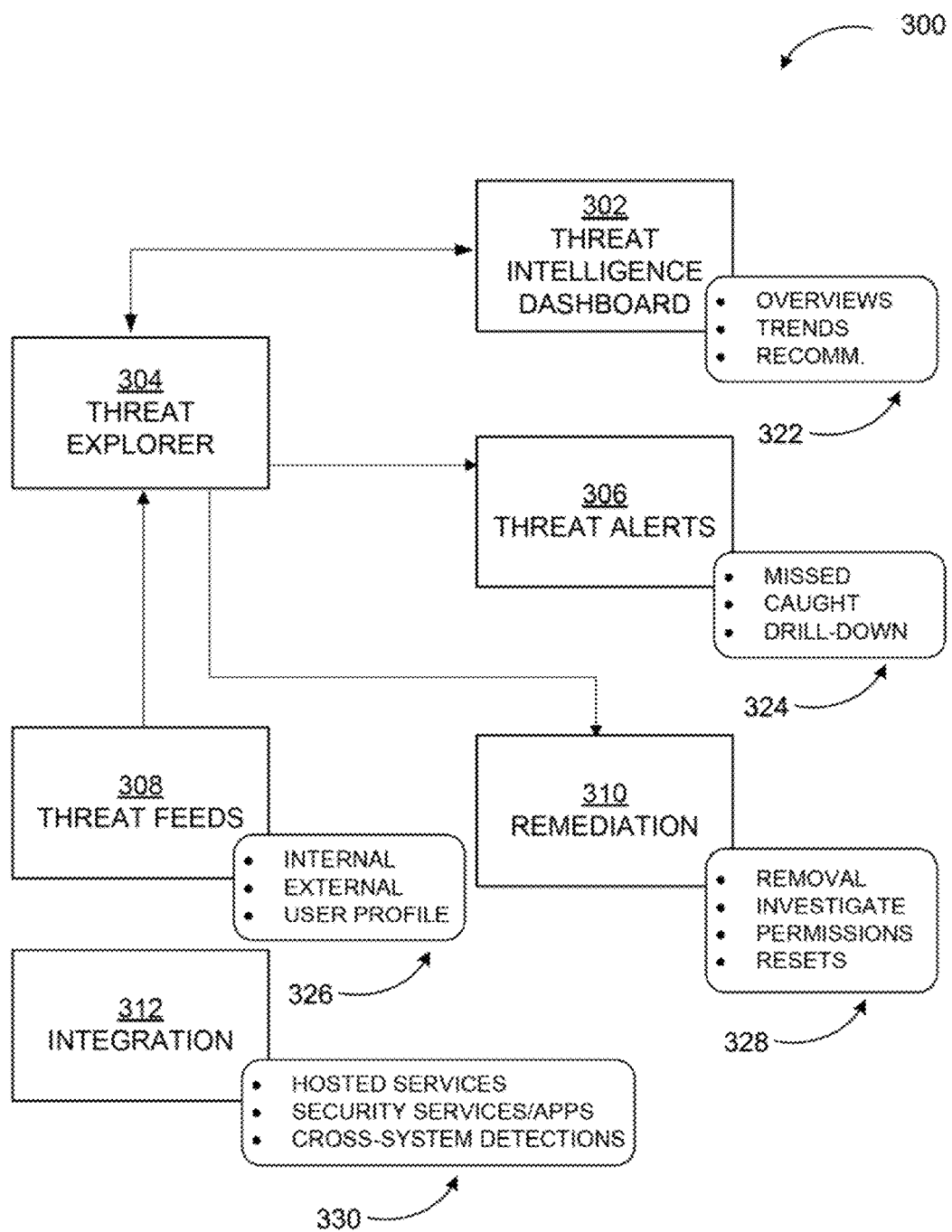
FIG. 3 includes a display diagram illustrating conceptually inputs and outputs of a threat explorer module providing threat intelligence management in a security and compliance environment.

FIG. 3 includes a display diagram illustrating conceptually inputs and outputs of a threat explorer module providing threat intelligence management in a security and compliance environment.

In the example configuration of diagram 300, a threat explorer module 304 may receive as input threat feeds 308, which may include internal threat data, external threat data, and user profiles 326. Analyzing the threat data in light of contextual factors such as user profiles, activities, affected data types, etc., the threat explorer module 304 may generate threat alerts 306, remediation actions 310, and manage a threat intelligence dashboard 302. The threat intelligence dashboard 302 may provide overviews of current protection levels, determined and potential threats, threat trends (e.g., global), and recommendations for additional protection 322. Threat alerts 306 may include alerts on missed threats (e.g., delivered communications or stored data with potential threats), caught/stopped threats, etc. 324. Remediation actions 310 may include removal of missed or caught threats, investigation options (for missed threats), modification or permission levels, resetting of user profiles, activities, and system components 328.

Another aspect of threat intelligence management in a security and compliance environment may include integration 312, where the threat explorer module 304 and its activities may be integrated with different hosted services, security services or applications, as well as cross-system detections 330. For example, the same threat explorer module 304 may provide threat intelligence management services to multiple hosted services (e.g., a productivity service, a collaboration service, a communication service) and/or coordinate its operations with one or more security services or applications (e.g., virus protection applications, phishing protection services, etc.). The system may also interoperate with operating systems, cloud storage systems, and others to receive access to data and information and provide feedback on threat analyses. The system may also allow integration into different portals and connection and user experience may be changed from platform to platform based on the threat (e.g., a productivity service to operating system and back).

In some embodiments, threats may be analyzed intelligently. For example, emails with a similar body, but from different sources may be investigated; first contacts from external sources may be investigated. Investigation and remediation may be customized based on user or organization level risk assessments. For example, if a user shares documents and communicates with large number of other users or has access to confidential data, that user may be considered higher risk/priority). Remediation actions may be document based, user based, or system policy based. If some threats pass through the defenses, investigations at multiple levels may be enabled and threats removed post-fact. Investigation and remediation audit trails (e.g., deletion of emails) may be maintained according to a policy. Example remediation actions may include implementation of a suggested policy and restriction of one or more of a delete action, a share action, a copy action, a move action, an anonymous link creation, a synchronization, a site creation, a created exemption, a permission modification, a purge of email boxes, a folder movement, a user addition, and/or a group addition.

Figure 4:
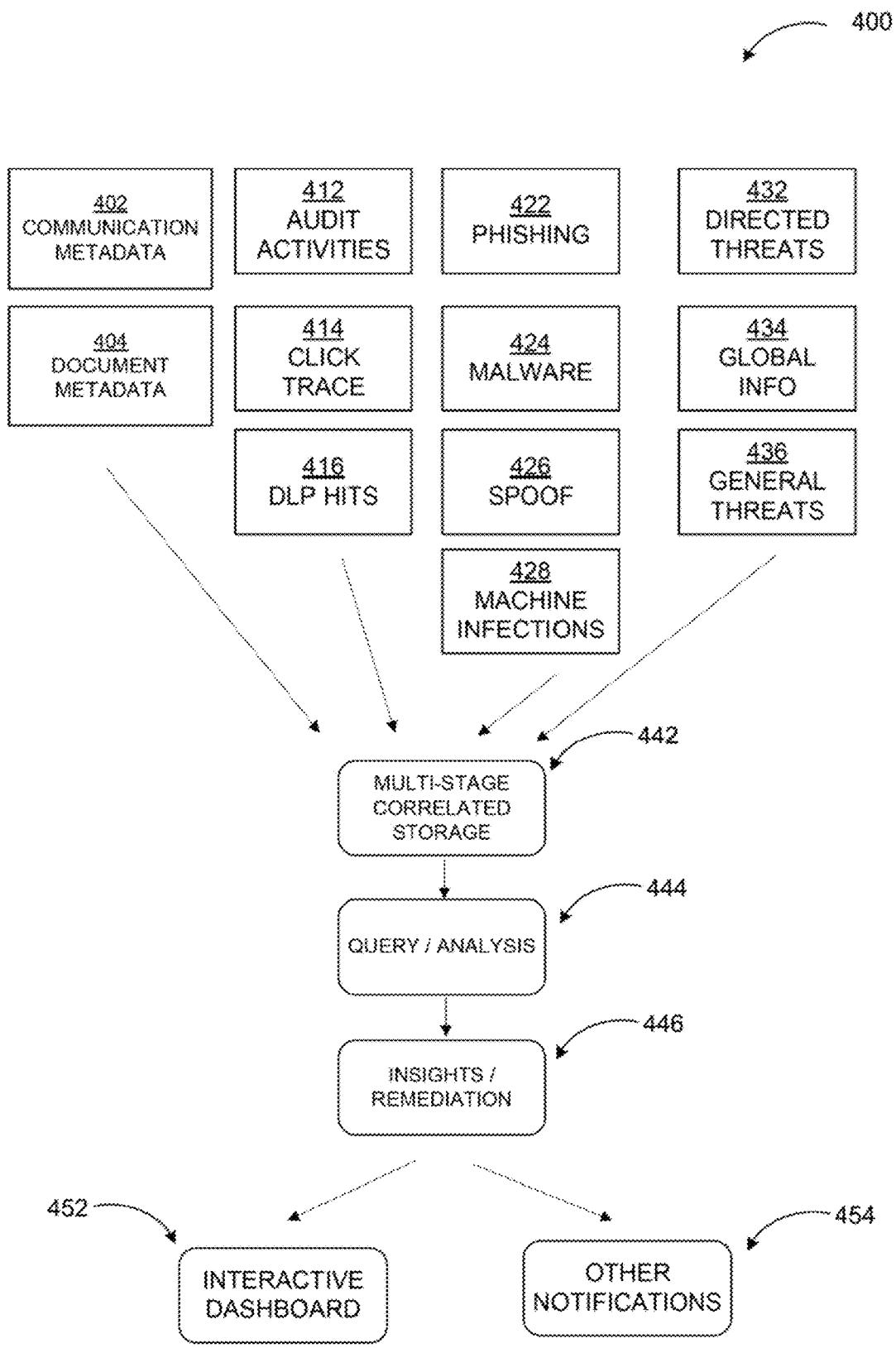
FIG. 4 includes a display diagram illustrating example inputs into a system to analyze threats and generate insight and remediation output according to embodiments.

FIG. 4 includes a display diagram illustrating example inputs into a system to analyze threats and generate insight and remediation output according to embodiments.

As shown in diagram 400, a system according to embodiments may receive communication and document metadata 402, 404 to correlate stored communications, documents, and non-document content in a multi-stage, correlated storage 442. Further inputs to the system may include audit activities 412, click traces 414, data loss prevention (DLP)

hits 416. Threat information (received or potential) may include phishing attempts 422, malware 424, spoofing emails 426, and machine infections 428, among others. Furthermore, directed or targeted threats 432 (targeting a specific person, group, infrastructure component, or data category), generalized threats 436, and global threat trend information 434.

Insights on received and potential threats, as well as, remediation actions 446 may be derived through a query-based analysis 444 on the data at the multi-stage, correlated storage 442. An interactive dashboard 452 providing visualizations and actionable items associated with protection status, threats, remediation actions, drill-down operations, etc. may be managed based on the derived insights and remediation actions 446. In other embodiments, notifications 454 such as alerts, reports, and comparable ones may also be generated and provided based on the derived insights and remediation actions 446.

In some example implementations, a chain of events associated with user may be followed and remediation actions categorized based on the chain of events (e.g., what actions user took, what potential consequences, etc.) if the user receives malware or similar threat. For example, the user may receive a suspect email, open a document, save the document on cloud storage, which may be opened by another user, etc. The entire chain of events may be part of the investigation allowing the system to perform corrective actions on affected communications, documents, and other resources within the system.

Remediation actions may be coordinated and grouped based on threat and affected data. For example, multiple actions (e.g., deletion, alert to user, stop sharing, etc.) may be implemented in response to detection of a severe threat, whereas a relatively benign threat may result in just notification of the user or an administrator. Remediation actions may be determined based on users (e.g., a user profile indicating a risk level associated with the user, a volume of documents processed by the user or communications exchanged by the user, etc.). Remediation actions may also be determined based on documents (e.g., sensitive information content of a document, a sharing status of the document, etc.) or based on defined system policies (e.g., threats to data associated with certain departments of an organization may be associated with stricter remediation actions compared to other departments where the policy may dictate a more relaxed approach).

Figure 5A:
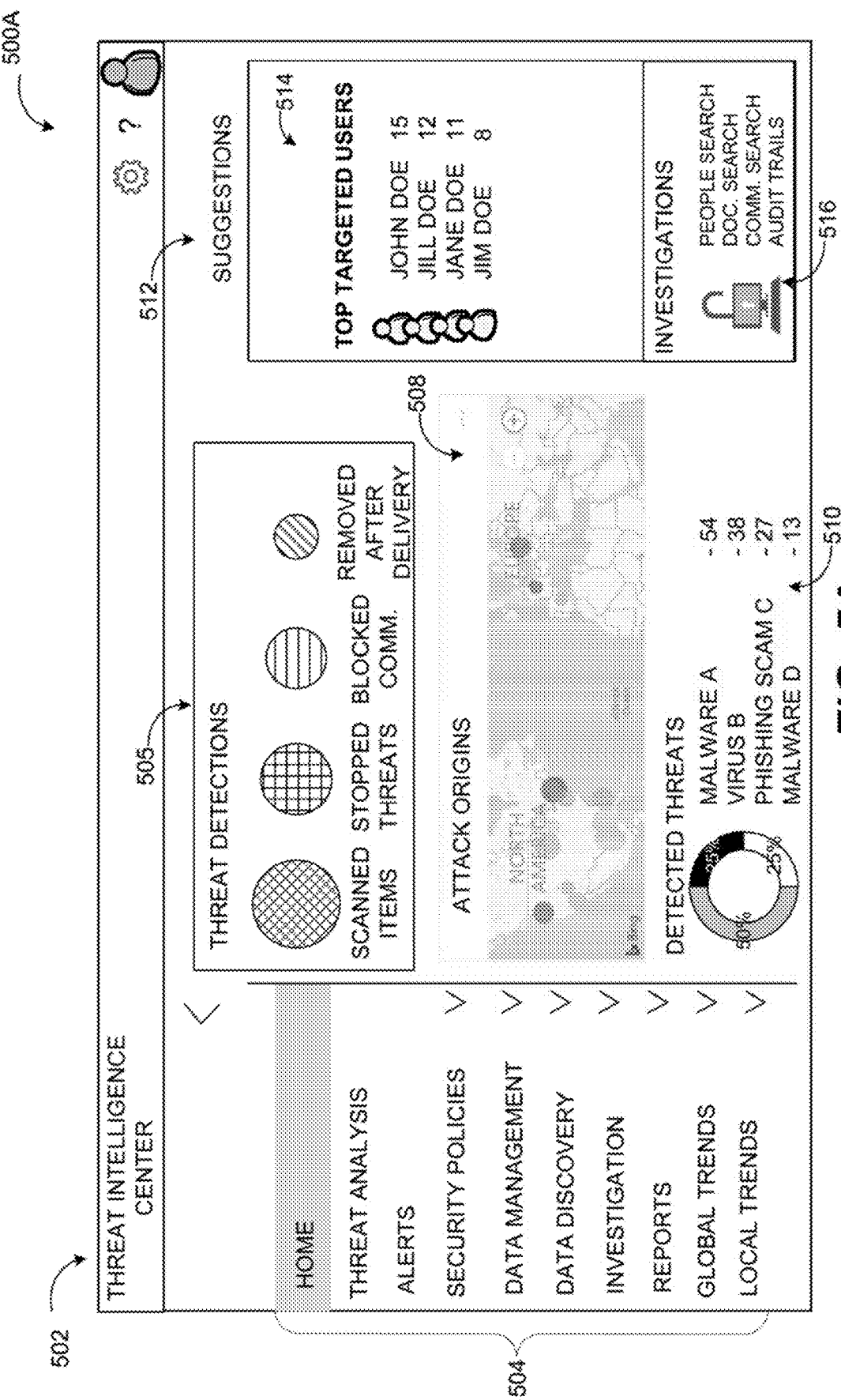
FIGS. 5A and 5B include display diagrams illustrating visualizations and actions on an example threat explorer dashboard.
Figure 5B:
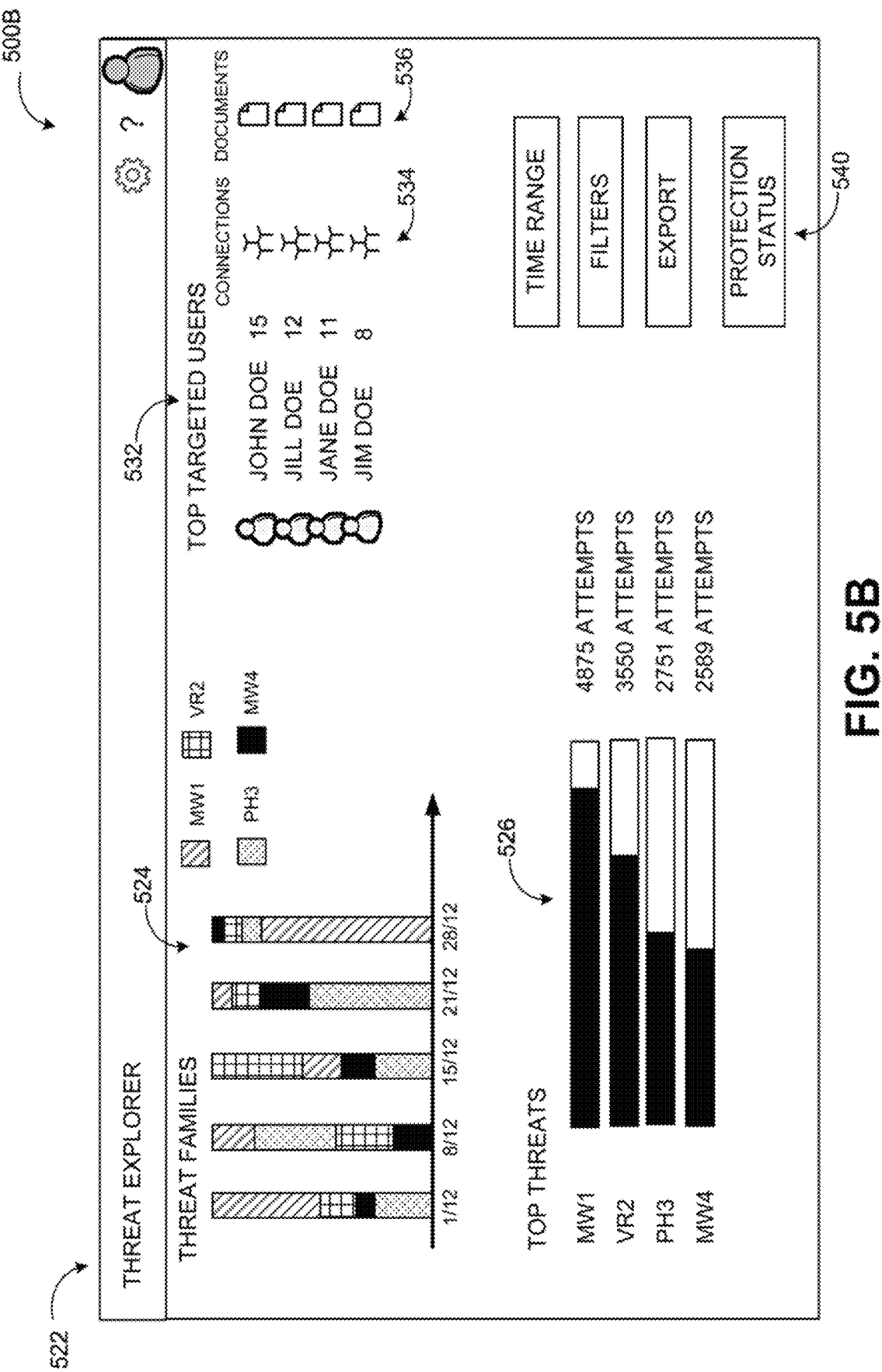

FIGS. 5A and 5B include display diagrams illustrating visualizations and actions on an example threat explorer dashboard.

As shown in diagrams 500A and 500B, a threat intelligence dashboard may provide visual information associated with current threats, protection status, and investigations with actionable items allowing selection of more detailed views, drill-down operations, and remediation actions. For example, dashboard 502 in diagram 500A may present a user experience with visual and actionable information on potential threats and detected threats (global, industry level, regional, type, and other categories) using charts, lists, and/or maps (map or origination, affected areas, etc.). Through various schemes (color, shading, graphic, textual, etc.) correlation between internal and external threats may be displayed along with detailed information available through drill-down (i.e., user can click on any displayed data point and be provided individual data). The user experience may also indicate whether threats are directed to the organization (or a particular group/people within the organization) or are general. Automatic remediation actions and results may be displayed along with suggested actions.

Among other things, the dashboard 502 may comprise a plurality of tabs 504 that each offer one or more security and compliance-based features that may be managed by the tenant, administrators, and/or users through the dashboard 502. Example tabs 504 may include a home dashboard view, and additional views associated with threat analysis, alerts, security policies, data management, data discovery, investigation, reports, global trends, and local trends.

In the example dashboard 502, threat detections 505 presents various categories of threat detections graphically (e.g., scanned items, topped threats, removed threats, etc.). Detected threats 510 may present graphically and textually types of threats detected such as malware, viruses, phishing, scams, etc. An attack origins map 508 may display a geographical map of where the detected threats originate from. A top targeted users list 514 may display a list of users who receive the most targeted threats. The displayed information may include the ability to drill down. For example, by selecting one of the users in the top targeted users list 514, an administrator may be able to see details of threats received by that user, documents or communications affected by the threats, and even follow a chain of events, that is, see other users who may be affected by the selected user through exchanged communication, shared documents, etc. The dashboard 502 may also display suggestions 512 providing policy or remediation action proposals in light of the threat analysis, and an investigations section 516 that may allow the administrator to perform searches on people, communications, documents, and other threat related topics. Audit trails may also be accessed through the investigations section 516.

Example dashboard 522 includes visual presentations of different types. For example, a threat families chart 524 may present a bar graph of detected threats on a time line showing their percentages among all detected threats. Elements of the bar graph may be actionable, that is, users may be allowed to drill down and see more detailed information on each threat type by selecting data points. A top targeted users list 532 may present (in addition to the list of users as shown in dashboard 502) graphical selection options to see connections 534 of each users (e.g., people who exchange communications with a selected user, people who share documents with the selected user, etc.). The graphical selection options may also include documents 536 that, when selected, may present documents handled by the selected user, which may be affected by a threat.

Top threats 526 graphic may display top received or detected threats using bar graphs along with the numbers of the threats, one or both of which may be actionable. The dashboard 522 may also include controls 540 for further actions such as adjusting time range for threat analysis, selecting or modifying filters for the visualizations or the analysis, exporting analysis results or other related data, and providing protection status.

The visualizations may include graphic representations such as bar charts, pie charts, maps, and other representations employing a variety of highlighting, color, textual, graphic, and shading schemes. Some or all of the visualizations may be actionable, that is, a user may drill down on data by clicking on elements of the visualization, see details, change filtering parameters, change visualization parameters, etc. Users may reduce or increase the number, change the graphic representation, etc. In some embodiments, users may be enabled to combine visualizations. For example, an attack origins map may be combined with an attack types list such that a new visualization providing a map of different attack types and their origins may be presented.

The dashboards 502 and 522 are not limited to the above described components and features. Various graphical, textual, coloring, shading, and visual effect schemes may be employed to provide threat intelligence management in a security and compliance environment through a dashboard.

The examples provided in FIGS. 1A through 5B are illustrated with specific systems, services, applications, modules, and displays. Embodiments are not limited to environments according to these examples. Threat intelligence management in a security and compliance environment may be implemented in environments employing fewer or additional systems, services, applications, modules, and displays. Furthermore, the example systems, services, applications, modules, and notifications shown in FIG. 1A through 5B may be implemented in a similar manner with other user interface or action flow sequences using the principles described herein.

Figure 6:
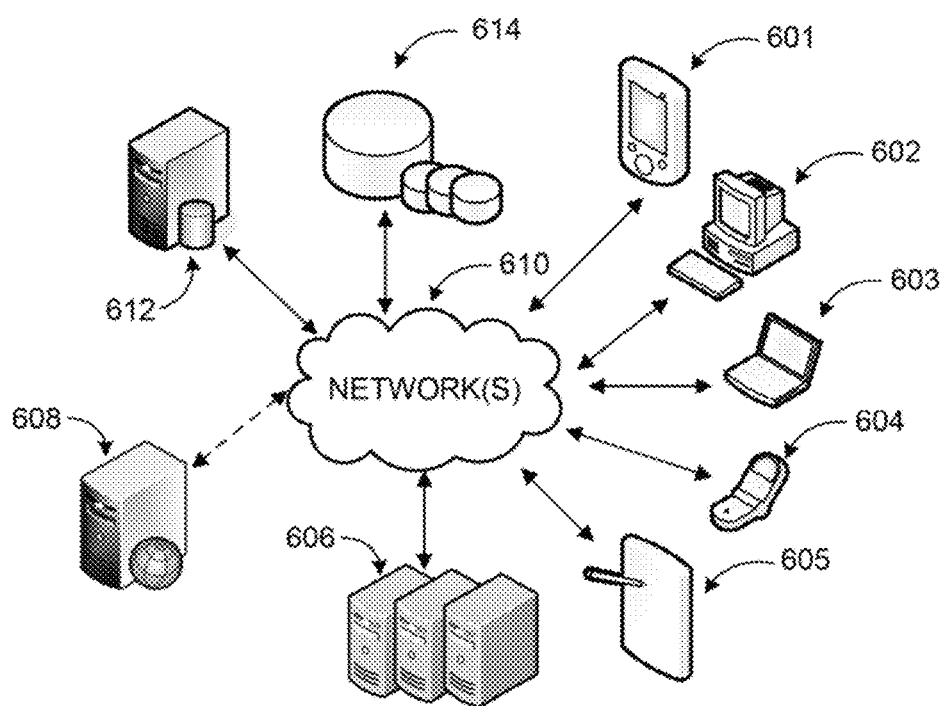
FIG. 6 is a networked environment, where a system according to embodiments may be implemented.

FIG. 6 is a networked environment, where a system according to embodiments may be implemented. A threat explorer module as described herein may be employed in conjunction with hosted applications and services (for example, the client application 106 associated with the hosted service 114, or the protection service 126) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface, such as a dashboard, presented to users.

Client devices 601-605 are used to access the functionality provided by the hosted service or client application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed to provide threat intelligence management in a security and compliance environment. Furthermore, the networked environments discussed in FIG. 6 are for illustration purposes only. Embodiments are not limited to the example applications, engines, or processes.

Figure 7:
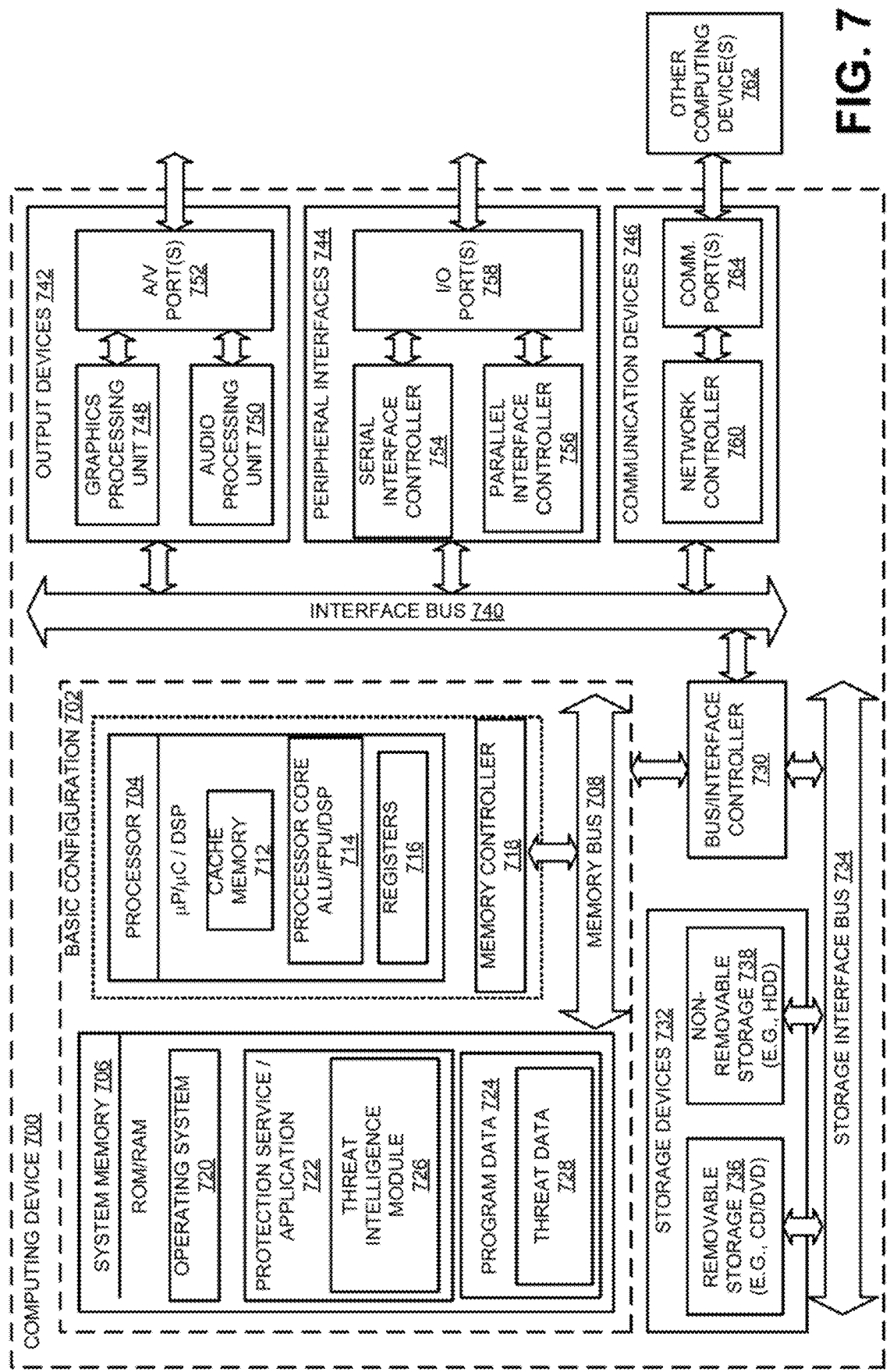
FIG. 7 is a block diagram of an example computing device, which may be used to provide threat intelligence management in a security and compliance environment.

FIG. 7 is a block diagram of an example computing device, which may be used to provide threat intelligence management in a security and compliance environment.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (μP), a microcontroller (μC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a protection application or service 722, and program data 724. The protection application or service 722 may include a threat intelligence module 726, which may be an integrated module of the protection application or service 722. The threat intelligence module 726 may be configured to analyze a tenant's service environment to determine received and potential threats based on an analysis of correlated and multi-stage evaluated data that includes communications, stored content, metadata and activities. A potential impact may be determined for each received threat based on analysis results and the received and potential threats and potential impacts presented through one or more interactive visualizations, where at least one element of each visualization is actionable. A remediation for each received threat may then be presented and/or automatically implemented. The program data 724 may include, among other data, threat data 728, such as the user information, hosted service information, etc., as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RE), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to provide threat intelligence management in a security and compliance environment. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
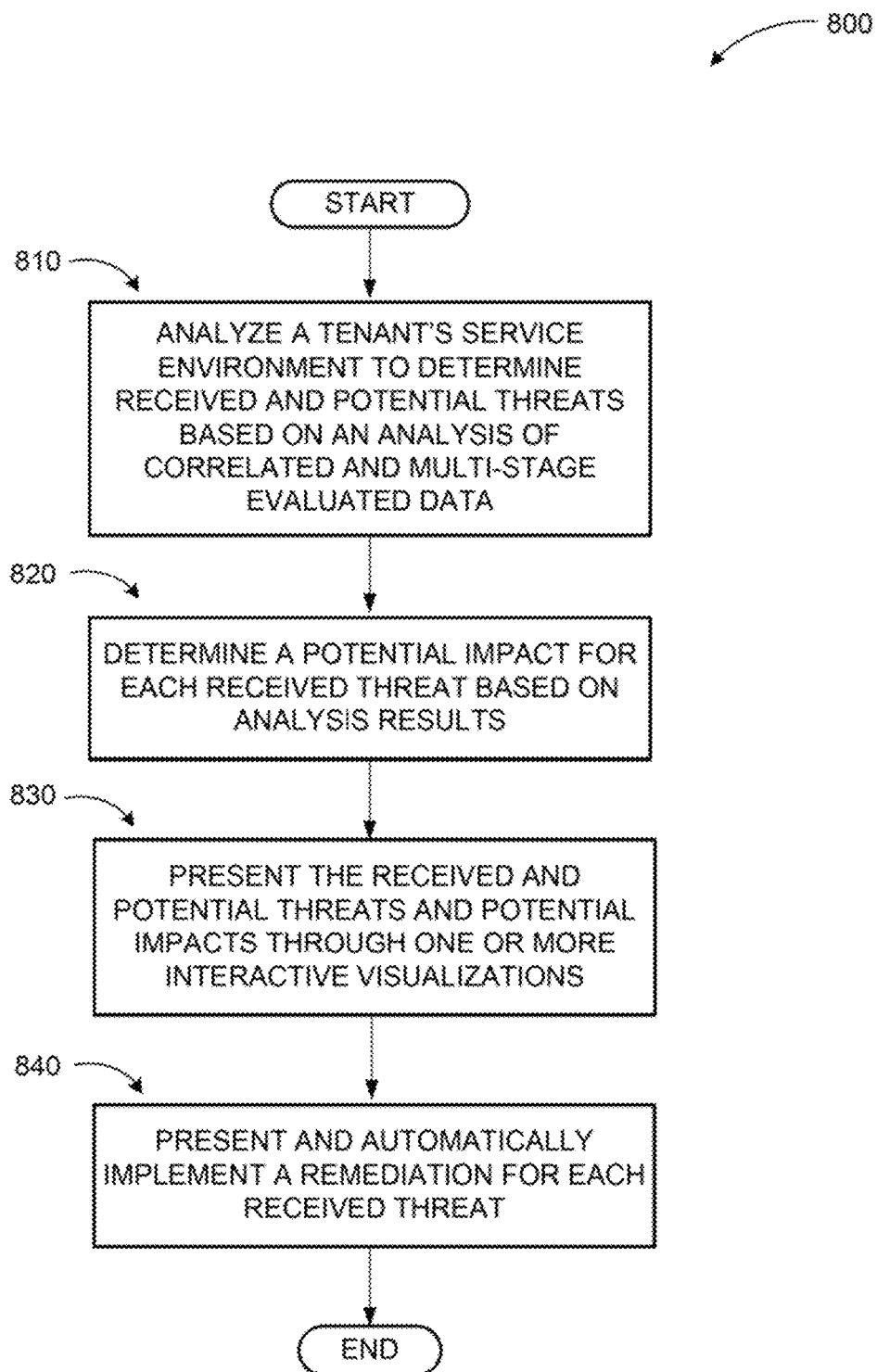
FIG. 8 illustrates a logic flow diagram of a method to provide threat intelligence management in a security and compliance environment, arranged in accordance with at least some embodiments described herein.

FIG. 8 illustrates a logic flow diagram of a method to provide threat intelligence management in a security and compliance environment. Process 800 may be implemented on a computing device, server, or other system. An example server may comprise a communication interface to facilitate communication between one or more client devices and the server. The example server may also comprise a memory to store instructions, and one or more processors coupled to the memory. The processors, in conjunction with the instructions stored on the memory, may be configured to provide threat intelligence management in a security and compliance environment.

Process 800 begins with operation 810, where a tenant's service environment such as stored data, communications, and activities may be analyzed to determine received and potential threats based on an analysis of correlated and multi-stage evaluated data. At operation 820, a potential impact of received threats may be determined based on analysis results. Received and potential threats and the determined potential impacts may be presented through one or more interactive visualizations on a dashboard at operation 830. At, operation 840, remediation actions for the received threats may be presented and/or automatically implemented.

The operations included in process 800 are for illustration purposes. Threat intelligence management in a security and compliance environment may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing threat intelligence for hosted services is described. The means may include a means for analyzing a tenant's service environment to determine received and potential threats based on an analysis of correlated and multi-stage evaluated data, where the correlated and multi-stage evaluated data includes communications, stored content, metadata, and activities. The means may also include a means for determining a potential impact for a received threat based on analysis results; a means for presenting received and potential threats and the potential impact through one or more interactive visualizations, where at least one element of each visualization is actionable; and one or more of a means for presenting and a means for automatically implementing a remediation action associated with the received threat.

According to some examples, a method to provide threat intelligence for hosted services is described. The method may include analyzing a tenant's service environment to determine received and potential threats based on an analysis of correlated and multi-stage evaluated data, where the correlated and multi-stage evaluated data includes communications, stored content, metadata, and activities. The method may also include determining a potential impact for a received threat based on analysis results; presenting received and potential threats and the potential impact through one or more interactive visualizations, where at least one element of each visualization is actionable; and one or more of presenting and automatically implementing a remediation action associated with the received threat.

According to other examples, the method may also include determining a user profile for a user associated with the received threat; and considering the user profile in the analysis. The user profile may include a risk assessment of the user based on one or more of exchanged communications, shared content, accessed content, and access locations.

Presenting the received and potential threats and the potential impact may include displaying one or more of a chart, a map, and textual information associated with the received and potential threats and the potential impact. The one or more of a chart, a map, and textual information associated with the received and potential threats and the potential impact may include actionable elements that enable an administrator to drill down on a portion of displayed information. The method may further include enabling an administrator to one of filter and combine the one or more visualizations based on a selected criterion.

According to further examples, the method may also include providing an investigation option to search through communications and data associated with a user associated with the received threat to determine affected communications and data. The method may further include determining the remediation action based on the affected communications and data, and tailoring the one or more visualizations based on a tenant profile, where the tenant profile includes one or more of an industry, a size, a geographical location, a hosted service ecosystem, a role, a regulatory requirement, a legal requirement, and a threat history associated with the tenant. The remediation action may include one or more of transmission of a notification, removal of affected communications and data, modification of user permissions, resetting of a system configuration, and launching of an investigation. The method may also include presenting one or more of a threat trend, a filtering option, a configuration option, a protection status, a time range definition option, and a data export option.

According to other examples, a server configured to provide threat intelligence for hosted services is described. The server may include a communication interface configured to facilitate communication between another server hosting a security and compliance service, one or more client devices, and the server; a memory configured to store instructions; and one or more processors coupled to the communication interface and the memory and configured to execute a threat intelligence module. The threat intelligence module may be configured to analyze a tenant's service environment to determine received and potential threats based on an analysis of correlated and multi-stage evaluated data, where the correlated and multi-stage evaluated data includes communications, stored content, metadata, and activities; determine a potential impact and a remediation action associated with a received threat based on analysis results; present a dashboard that includes one or more interactive visualizations representing one or more of threat trends, received and potential threats, and the potential impact, where a portion of the one or more visualizations is actionable; and automatically implement the remediation action associated with the received threat.

According to some examples, the remediation action may include one or more of transmission of a notification, removal of affected communications and data, modification of user permissions, resetting of a system configuration, implementation of a suggested policy and restriction of one or more of a delete action, a share action, a copy action, a move action, an anonymous link creation, a synchronization, a site creation, a created exemption, a permission modification, a purge of email boxes, a folder movement, a user addition, and a group addition. The threat intelligence module may be further configured to present a list, of targeted users; and enable a drill down operation on the list of targeted users to determine the impact of the received threat.

According to other examples, the drill down operation may include presentation of one or more of exchanged communications, shared documents, processed documents, and used resources by the targeted users. The threat intelligence module may be further configured to follow a chain of events associated with a missed threat, where the chain of events includes determining a list of potentially affected communications and data, and connections between a user affected by the missed threat and other users. The threat intelligence module may also be configured to adjust one or more of a connection and a dashboard configuration based on a used platform and a type of threat. The platform may be an operating system or a hosted service.

According to further examples, a computer-readable memory device with instructions stored thereon to provide threat intelligence for hosted services, where the instructions, when executed, are configured to cause one or more computing devices to perform actions. The actions may include analyze a tenant's service environment to determine received and potential threats based on an analysis of correlated and multi-stage evaluated data, where the correlated and multi-stage evaluated data includes communications, stored content, metadata, and activities; determine a potential impact and a remediation action associated with a received threat based on analysis results; present a dashboard that includes one or more interactive visualizations representing one or more of threat trends, received and potential threats, and the potential impact, where a portion of the one or more visualizations is actionable; customize the dashboard based on one or more of detected threat types, a tenant profile, and a platform; and automatically implement the remediation action associated with the received threat. According to yet other examples, the actions may also include determine whether the received threat is a targeted threat or a general threat.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide threat intelligence for hosted services, the method comprising:
   receiving data associated with a tenant's service environment, wherein the received data includes communications, stored content, metadata associated with the received data, and activities associated with the received data;
   correlating the received data at multiple levels based on the metadata associated with the received data and the activities associated with the received data to generate correlated and multi-stage evaluated data;
   determining, based on a contextual correlation analysis of the correlated and multi-stage evaluated data, a threat, wherein the contextual correlation analysis is based on one or more contextual factors;
   determining, based on the contextual correlation analysis, a potential impact for the threat;
   presenting information regarding the threat and the potential impact through an interactive visualization, wherein at least one element of the interactive visualization is actionable;
   determining at least one targeted user receiving the threat;
   presenting a listing of the determined targeted users;

in response to receiving a selection of a user from the list of determined targeted users, presenting one or more selected from a group consisting of a communication exchanged with the selected user, a document shared by the selected user, a document processed by the selected user, and a resource used by the selected user; and one or more selected from a group consisting of presenting a remediation action and automatically implementing a remediation action associated with the received threat.

2. The method of claim 1, further comprising:
determining a user profile for the selected user; and
considering the user profile in the contextual correlation analysis.

3. The method of claim 2, wherein the user profile includes a risk assessment of the selected user based on one or more selected from a group consisting of an exchanged communication with the selected user, shared content associated with the selected user, content accessed by the selected user, and an access location associated with the selected user.

4. The method of claim 1, wherein presenting the received and potential threats and the potential impact comprises:
displaying one or more selected from a group consisting of a chart, a map, and textual information associated with the threat and the potential impact.

5. The method of claim 4, wherein the one or more selected from a group consisting of a chart, a map, and textual information associated with the threat and the potential impact include actionable elements that, when selected, drill down on a portion of the displayed information.

6. The method of claim 4, further comprising:
enabling, based on a selected criterion, an administrator to one or more selected from a group consisting of filter the one or more visualizations and combine the one or more visualizations.

7. The method of claim 1, further comprising:
searching through communications and data associated with a user associated with the received threat; and
determining, based on the searching through the communications and the data associated with a user associated with the threat, affected communications and data.

8. The method of claim 7, further comprising:
determining the remediation action based on the affected communications and data.

9. The method of claim 1, further comprising:
tailoring the one or more visualizations based on a tenant profile associated with a tenant, wherein the tenant profile includes one or more selected from a group consisting of an industry, a size, a geographical location, a hosted service ecosystem, a role, a regulatory requirement, a legal requirement, and a threat history associated with the tenant.

10. The method of claim 1, wherein the remediation action includes one or more selected from a group consisting of transmission of a notification, removal of affected communications and data, modification of user permissions, resetting of a system configuration, and launching of an investigation.

11. The method of claim 1, further comprising:
presenting one or more selected from a group consisting of a threat trend, a filtering option, a configuration option, a protection status, a time range definition option, and a data export option.

12. A server configured to provide threat intelligence for hosted services, the server comprising:

a communication interface configured to facilitate communication between another server hosting a security and compliance service, one or more client devices, and the server;

a memory configured to store instructions; and one or more processors coupled to the communication interface and the memory and configured to execute a threat intelligence module, wherein the threat intelligence module is configured to:

receive data associated with a tenant's service environment, wherein the received data includes communications, stored content metadata associated with the received data, and activities associated with the received data;

correlate the received data at multiple levels based on the metadata associated with the received data and the activities associated with the received data to generate correlated and multi-stage evaluated data;

determine, based on a contextual correlation analysis of the correlated and multi-stage evaluated data, a threat, wherein the contextual correlation analysis is based on one or more contextual factors;

determine, based on the contextual correlation analysis, a potential impact and a remediation action associated with the threat;

present a dashboard that includes one or more interactive visualizations representing one or more selected from a group consisting of threat trends, information regarding the threat, and the potential impact of the threat, wherein a portion of the one or more visualizations is actionable;

determine at least one targeted user receiving the threat;
present a listing of the determined targeted users;
in response to receiving a selection of a user from the listing of determined targeted users, presenting one or more selected from a group consisting of a communication exchanged with the selected user, a document shared by the selected user, a document processed by the selected user, and a resource used by the selected user; and
automatically implement the remediation action associated with the received threat.

13. The server of claim 12, wherein the remediation action includes one or more selected from a group consisting of transmission of a notification, removal of affected communications and data, modification of user permissions, resetting of a system configuration, implementation of a suggested policy, and restriction of one or more selected from a group consisting of a delete action, a share action, a copy action, a move action, an anonymous link creation, a synchronization, a site creation, a created exemption, a permission modification, a purge of email boxes, a folder movement, a user addition, or a group addition.

14. The server of claim 12, wherein the threat intelligence module is further configured to:
enable a drill down operation on the listing of determined targeted users to determine the impact of the received threat.

15. The server of claim 12, wherein the threat intelligence module is further configured to:
determining, based on following a chain of events associated with a missed threat, a list of potentially affected communications and data, and connections between a user affected by the missed threat and other users.

16. The server of claim 12, wherein the threat intelligence module is further configured to:

adjust, based on a used platform and a type of threat, a connection dashboard configuration.

17. The server of claim 16, wherein the used platform is one selected from a group consisting of an operating system and a hosted service.

18. A computer-readable memory device with instructions stored thereon to provide threat intelligence for hosted services, the instructions, when executed, configured to cause one or more computing devices to perform actions comprising:
   receive data associated with a tenant's service environment, wherein the received data includes communications, stored content metadata associated with the received data, and activities associated with the received data;
   correlate the received data at multiple levels based on the metadata associated with the received data and the activities associated with the received data to generate correlated and multi-stage evaluated data;
   determine, based on a contextual correlation analysis of the correlated and multi-stage evaluated data, a threat, wherein the contextual correlation analysis is based on one or more contextual factors;
   determine, based on the contextual correlation analysis, a potential impact and a remediation action associated with the threat;
   present a dashboard that includes one or more interactive visualizations representing one or more selected from a group consisting of threat trends, information regarding the threat, or the potential impact of the threat, wherein a portion of the one or more visualizations is actionable;
   customize the dashboard based on one or more selected from a group consisting of detected threat types, a tenant profile, and a platform;
   determine at least one targeted user receiving the threat;
   present a listing of the determined targeted users;
   in response to receiving a selection of a user from the listing of determined targeted users, presenting one or more selected from a group consisting of a communication exchanged with the selected user, a document shared by the selected user, a document processed by the selected user, and a resource used by the selected user; and
   automatically implement the remediation action associated with the received threat.

19. The computer-readable memory device of claim 18, wherein the actions further comprise:
   determine whether the threat is one selected from a group consisting of a targeted threat and a general threat.

* * * * *